United States Patent
Huberdeau et al.

(10) Patent No.: US 7,507,016 B2
(45) Date of Patent: Mar. 24, 2009

(54) AUGER FOR FEED MIXER

(75) Inventors: Joel Joseph Huberdeau, Wetaskiwin (CA); Jack Hendriks, Millet (CA)

(73) Assignee: Supreme International Limited, Wetaskiwin, Alberta (CA)

( * ) Notice: Subject to any disclaimer, the term of this patent is extended or adjusted under 35 U.S.C. 154(b) by 0 days.

(21) Appl. No.: 11/848,947

(22) Filed: Aug. 31, 2007

(65) Prior Publication Data
US 2008/0101154 A1 May 1, 2008

(30) Foreign Application Priority Data
Nov. 1, 2006 (CA) .................................. 2566407

(51) Int. Cl.
*B01F 7/24* (2006.01)
*B02C 18/08* (2006.01)

(52) U.S. Cl. ................. 366/314; 366/319; 366/603; 241/101.761

(58) Field of Classification Search ............. 366/302, 366/306, 307, 603, 314, 318–324, 266; 241/101.76, 241/101.761, 101.8, 260.1, 605
See application file for complete search history.

(56) References Cited

U.S. PATENT DOCUMENTS

| 3,469,824 | A | * | 9/1969 | Futty et al. ............. 366/64 |
| 3,592,128 | A | * | 7/1971 | French .................. 100/145 |
| 3,762,537 | A | * | 10/1973 | Lutz ..................... 198/664 |
| 4,328,925 | A | * | 5/1982 | Shapiro .................. 494/54 |
| 4,398,607 | A | * | 8/1983 | Reichardt ............... 172/119 |
| 5,154,510 | A | * | 10/1992 | Faccia ................... 366/193 |
| 5,279,407 | A | * | 1/1994 | Shobak ................... 198/677 |
| 5,289,979 | A | * | 3/1994 | Lesar .................... 241/82.6 |
| 5,429,581 | A | * | 7/1995 | Michaud et al. ........... 494/54 |
| 5,456,416 | A | * | 10/1995 | Hartwig ................. 241/260.1 |
| 5,462,354 | A | * | 10/1995 | Neier .................... 366/314 |
| 5,601,362 | A | * | 2/1997 | Schuler ................... 366/309 |
| 5,615,839 | A | * | 4/1997 | Hartwig ................. 241/260.1 |
| 5,647,665 | A | * | 7/1997 | Schuler ................... 366/196 |
| 5,863,122 | A | * | 1/1999 | Tamminga ............... 366/314 |
| 6,328,465 | B1 | * | 12/2001 | Tamminga ............... 366/314 |
| 6,409,377 | B1 | * | 6/2002 | Van Der Plas .......... 366/297 |
| 6,834,989 | B2 | | 12/2004 | Tamminga |
| 6,863,433 | B2 | | 3/2005 | Knight |
| 6,905,238 | B2 | | 6/2005 | Albright et al. |
| 7,153,020 | B2 | * | 12/2006 | Van Der Plas .......... 366/193 |
| 7,281,843 | B1 | * | 10/2007 | Pellman et al. ........... 366/297 |

(Continued)

FOREIGN PATENT DOCUMENTS

CA 2307962 * 11/2001

(Continued)

*Primary Examiner*—Charles E Cooley
(74) *Attorney, Agent, or Firm*—J. Jay Haugen; Parlee McLaws LLP

(57) ABSTRACT

An auger for a vertical livestock feed mixer having an open-top mixing tub is provided. The auger includes two flights to draw in feed components from the bottom of the mixer tub and move them to the top. The trailing edge of the upper auger flight includes an upraised portion to deflect feed components towards the sidewalls of the feed mixer. The leading edge of the lower auger flight includes a kicker plate on the topside of the flight to deflect feed components towards the centre of the auger.

19 Claims, 4 Drawing Sheets

U.S. PATENT DOCUMENTS

2006/0126430 A1 * 6/2006 Cicci et al. .................. 366/314

FOREIGN PATENT DOCUMENTS

| CA | 2307962 | A1 | | 11/2001 |
|---|---|---|---|---|
| DE | 10140458 | A1 | * | 9/2002 |
| EP | 1082896 | A1 | * | 3/2001 |
| EP | 1224859 | A1 | * | 7/2002 |
| EP | 1417999 | A2 | * | 5/2004 |
| EP | 1417999 | A3 | | 7/2004 |
| GB | 2310793 | A | * | 9/1997 |

* cited by examiner

AUGER FOR FEED MIXER

FIELD OF THE INVENTION

The present invention is related to the field of augers used to mix livestock feed in feed mixers and, in particular, to augers for use in vertical feed mixers.

BACKGROUND

Vertical feed mixers having open-top mixing tubs have been used in agriculture for many years. Vertical mixers process forages and commodities of all types of feed for livestock. Vertical mixers include a tub containing one or more vertical augers. These augers can have knives mounted on their flights such that when the augers rotate, the knives will cut the forage and the augers will process and blend the components within the tub. The result will yield a total mixed ration ("TMR").

There are commodities or components that cannot be readily processed and blended with currently known mixing augers such as wet distiller's grain (ethanol by-product) and steam-flaked corn. These are two feed components typical in most TMRs fed to beef cattle. Typical rations will consist of small percentages of pre-processed roughage (less than 5%) and high percentages of steam-flaked corn and wet distiller's grain (ethanol by-product). If these two components are improperly mixed, reduced particle size, breakage of the feed components into fines and balling of the wet distiller's grain can result in the TMR.

The inability of current auger designs to effectively process and blend these components has limited the mixer usefulness to some producers and/or end-users. Currently known auger designs comprise three flight sections and have a narrower profile. These auger designs cannot move enough feed mix (ration make-up) from the bottom of the mixing tub to the top of the auger flights without causing breaking or reducing the particle size of steam-flaked corn. The result is too many fines in the mixture thereby making the entire ration useless. When high percentages of the wet distiller's grain (ethanol by-product) are used in feed mixtures with current auger designs, balling of the feed mixture can result thereby preventing the feed ration from being consistently mixed throughout. Again, this makes the entire ration practically useless.

SUMMARY

A livestock feed auger is provided for use in a feed mixer tub. In one embodiment, the auger is a vertical auger designed to blend rations that are specific to livestock operations. In another embodiment, the auger is used to blend rations specific to beef cattle operations.

In yet another embodiment, the auger can quickly, efficiently, and gently move ration components from the bottom of the mixing tub to the top of the auger flights. The auger can perform this operation in less than two complete 360-degree revolutions of the auger.

In still another embodiment, the auger can minimize fines and ensure the accurate and consistent distribution of the wet distiller's grain throughout the entire ration (TMR).

In another embodiment, the auger can allow the feed mixer to quickly and accurately blend all components of the TMR, specifically, high percentages of steam-flaked corn and wet distiller's grain (ethanol by-product).

In yet another embodiment, the auger can gently blend fragile feed ration components, such as steam-flaked corn, without producing an unacceptable amount of fines.

In yet another embodiment, the auger can allow the feed mixer to completely blend the wet distiller's grain (ethanol by-product) accurately throughout the entire ration with minimal variance.

In another embodiment, the auger comprises a vertical pipe and less than two complete 360-degree auger flights disposed about the pipe. In another embodiment, the auger flights comprise an upper or top flight and a lower or bottom flight that are joined end-to-end on the pipe. In another embodiment, the tail-end of the top flight comprises an up-turned portion or corner. In another embodiment, the leading edge of the bottom flight comprises a deflecting element disposed on the topside of the bottom flight, referred to as a "kicker plate", for deflecting feed components towards the centre of the auger. In other embodiments, the pipe is approximately 18 inches in diameter with the top and bottom flights being approximately 18 inches wide. In these embodiments, the pitch spacing between the auger flights is approximately 21 inches, +/−2 inches, whereby the pitch spacing is greater in dimension than the width of the flights.

With an auger configured in accordance with one embodiment, ration components such as steam-flaked corn and wet distiller's grain are moved from the bottom of a feed mixing tub to the top of the mixing tub by the auger in fewer revolutions than a conventional vertical mixing auger.

DETAILED DESCRIPTION

Figure 2:
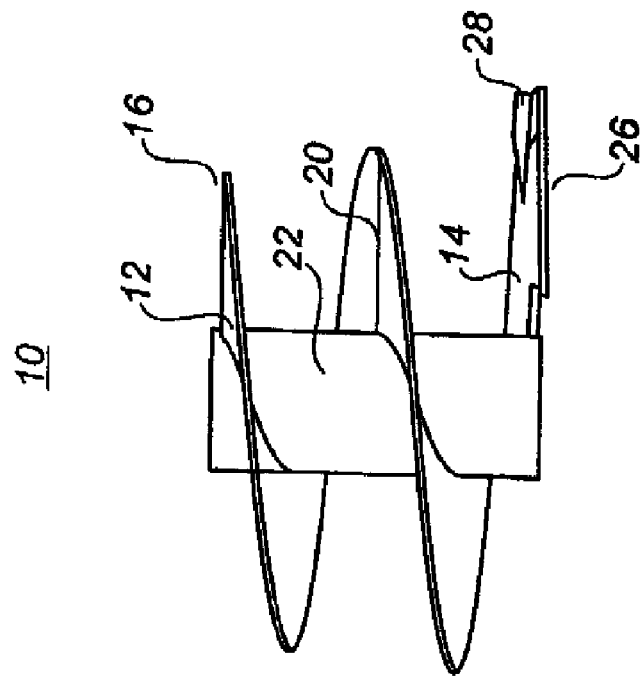
FIG. 2 is a side elevational view depicting the auger of FIG. 1.

A livestock feed auger for a feed mixing tub is provided. A representative embodiment of auger 10 is shown in FIGS. 1 to 6. In this embodiment, auger 10 comprises top flight 12 and bottom flight 14. In a representative embodiment, flights 12 and 14 are cut out of plate steel and then pressed into a spiral of less than 720 degrees of revolution. The flights are then placed onto pipe 22 for fitting and attachment to pipe 22 whereby auger 10 comprises less than two complete 360-degree flights from the bottom of pipe 22 to the top of pipe 22. In one embodiment, flights 12 and 14 are welded together attached end-to-end along seam 20 and are welded to pipe 22. Any material suitable for augers may be used in the construction of auger 10. In a representative embodiment, AR200 steel can be used for flights 12 and 14.

Positioned within pipe 22 is ring 40. Ring 40 is attached to the interior of pipe 22, typically by welding, and is used to bolt auger 10 onto a mixer drive unit of a feed mixer (not shown). Positioned above ring 40 within pipe 22 is auger lifting brace 38. Lifting brace 38 is provided to facilitate lifting auger 10 when installing into or removing from a vertical feed mixer. Disposed on lifting brace 38 is lock nut 39. An auger pipe cap (not pictured) is fitted onto pipe 22 once auger 10 is installed onto a feed mixer. The auger pipe cap is fixed to pipe 22 with a bolt (not pictured) by threading the bolt into lock nut 39.

In another embodiment, top flight 12 further comprises upturned portion 16. Upturned portion 16 is not attached perpendicular to auger pipe 22 like the rest of flights 12 and 14 but is attached to pipe 22 at an upward facing angle. In a further embodiment, this angle is approximately 22 degrees above the horizontal. Including upturned portion 16 on top flight 12 tends to produce a "volcanic effect" as feed rations roll off of top flight 12. In this manner, rations are forced off of top flight 12 in an outward direction toward the mixer walls where they fall to the bottom of the mixing tub to allow the entire mixing process to repeat. This promotes blend accuracy while reducing fines, balling, and mixing or blending time. In another embodiment, auger 10 further comprises top flight brace 18 that reinforces top flight 12 in order to maintain the position of upturned portion 16.

Figure 3:
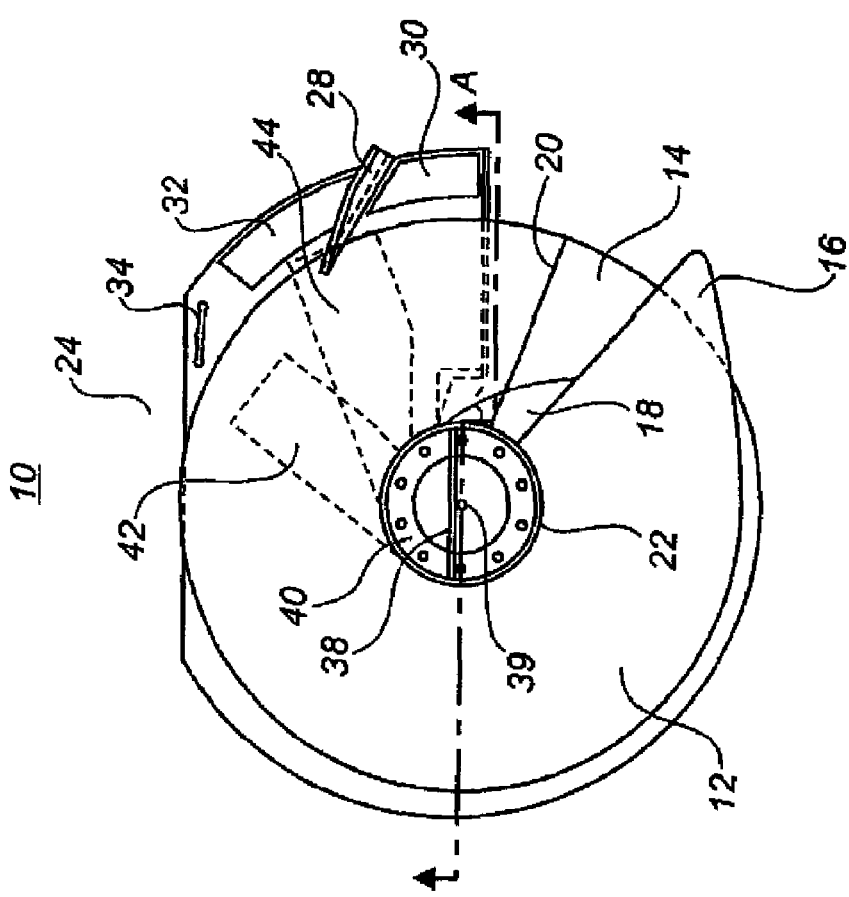
FIG. 3 is a top plan view depicting the auger of FIG. 1.
Figure 5:
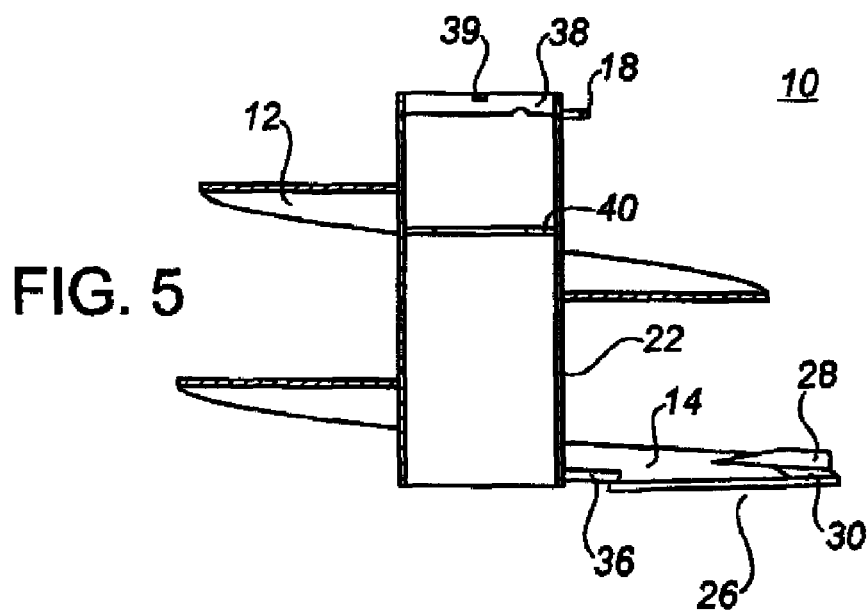
FIG. 5 is a side cross-sectional view depicting the auger of FIG. 3 along section lines A-A.

In another embodiment, bottom flight 14 comprises leading edge 26 that extends outwardly beyond the width of top flight 12 towards the wall of a mixing tub (not shown). The width of leading edge 26 is cut dependent on the size of the vertical feed mixer auger 10 will be used in. In one embodiment, leading edge 26 can be in the range of approximately 27 inches to 52 inches wide. When auger 10 rotates, leading edge 26 moves ration components from the mixer tub floor onto bottom flight 14. The outer edge of bottom flight 14 moves ration components from the mixer walls onto bottom flight 14. In yet another embodiment, bottom flight 14 further comprises kicker plate 28. Kicker plate 28 is placed on the outer edge of bottom flight 14 to direct feed ration components into the center of auger 10 to aid in the mixing of the components. The size and position of kicker plate 28 on bottom flight 14 can directly affect the performance of auger 10. Kicker plate 28 also aids in the discharge of the TMR out of the mixing tub when a delivery door on a sidewall of the mixing tub (not shown) is opened. In a representative embodiment, kicker plate 28 can be in the range of approximately 11 inches to 16 inches wide and placed on bottom plate 14 such that the outermost end of kicker plate 28 is positioned approximately 10 inches from leading edge 26 whereas the innermost end of kicker plate 28 is positioned approximately 18 inches from leading edge 26 such that feed components striking kicker plate 28 are deflected towards the centre of auger 10. The relative positioning of kicker plate 28 is shown in FIG. 3.

Figure 6:
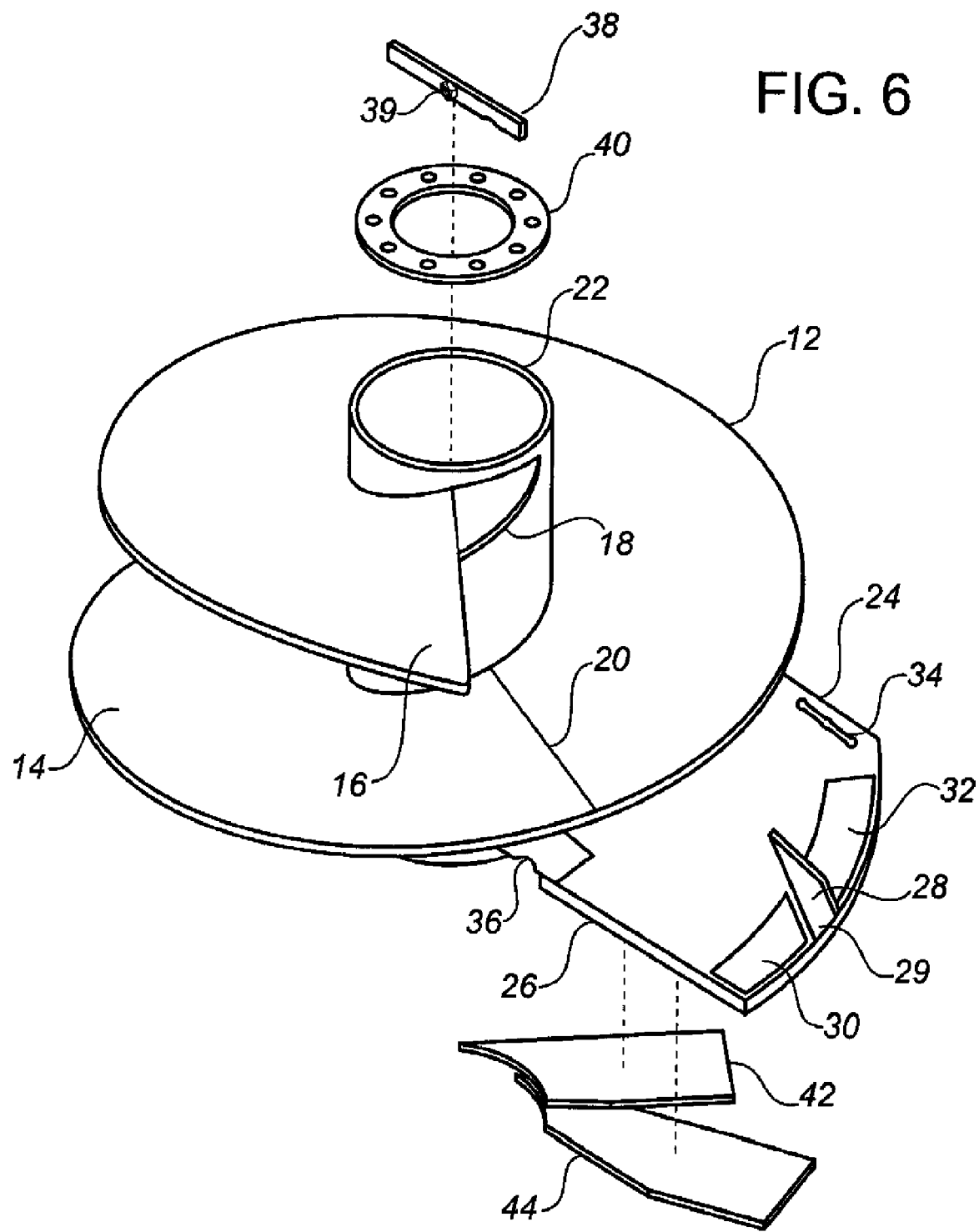
FIG. 6 is a top perspective exploded view depicting the auger of FIG. 1.

In another embodiment, bottom flight 14 further comprises stainless steel wear plates 30 and 32 located on the outer edges of bottom flight 12 on either side of kicker plate 28. Additionally, as shown in FIG. 6, a wear plate 29 can be mounted on a front face of kicker plate 28. The use of wear plates 29, 30 and 32 decrease the wear rates of the AR200 steel typically used in embodiments of auger flights 12 and 14. In another embodiment, bottom flight 14 can further comprise knife-mounting slot 34. This allows a user the option of adding a knife (not shown) to slot 34 of auger 10 to further process any roughage that can be added to the ration.

A side view of auger 10 is shown in FIG. 2. In one embodiment, the width of flights 12 and 14 are in the range of approximately 12 inches to 18 inches. The spacing or pitch between the auger flights is approximately 21 inches, +/−2 inches whereby the pitch spacing is greater in dimension than the width of flights 12 and 14. This spacing provides enough room between flights to carry more feed components from bottom to the top of auger 10. In the illustrated representative embodiment, this flight spacing or pitch allows feed components to be moved from the bottom to the top in less than two complete 360-degree revolutions of auger 10. In providing an auger that moves feed components from the bottom of a mixing tub to the top in two auger revolutions, the amount of fines produced in the TMR is reduced. It is also observed that ration components that have greater moisture content, such as wet distiller's grain, are less likely to ball because of this increased flight spacing.

Figure 1:
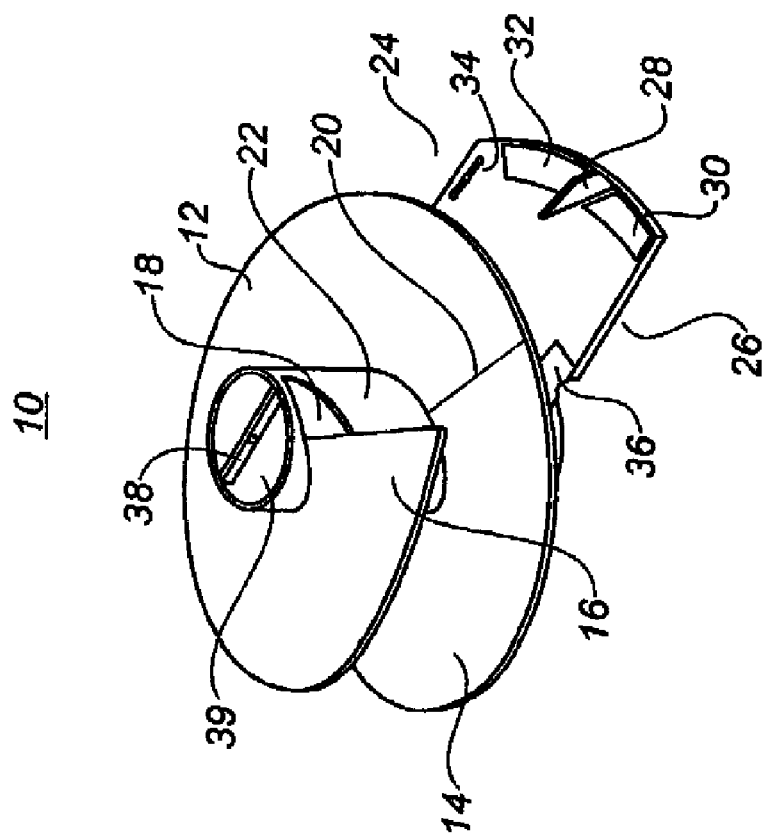
FIG. 1 is a top perspective view depicting a two-flight auger having a feed deflector disposed on the top surface of the leading edge of the bottom flight.

In a representative embodiment, top flight 12 is approximately the same width as bottom flight 14 measured from the trailing edge of cutaway section 24. Cutaway section 24 of bottom flight 14 allows ration components to fall down the sidewalls of the mixer tub, past the auger flights, to the mixer floor. It is observed that the inclusion of cutaway section 24 on bottom flight 14 acts to reduce the horsepower and torque required to rotate auger 10. This promotes blend accuracy and less variance throughout the entire ration. The structural aspects of top flight 12 and bottom flight 14 makes auger 10 approximately cylindrical in design. It is observed that this cylindrical design ensures that the ration components moved onto bottom flight 14 stay on auger 10 until the components reach upturned portion 16 and promotes blend accuracy of the TMR with fewer revolutions of auger 10. In another embodiment, bottom flight 14 further comprises cover plate 36, as shown in FIG. 1. Cover plate 36 shields the fasteners that bolt the auger drive unit (not shown) to the floor of a vertical feed mixer.

Figure 4:
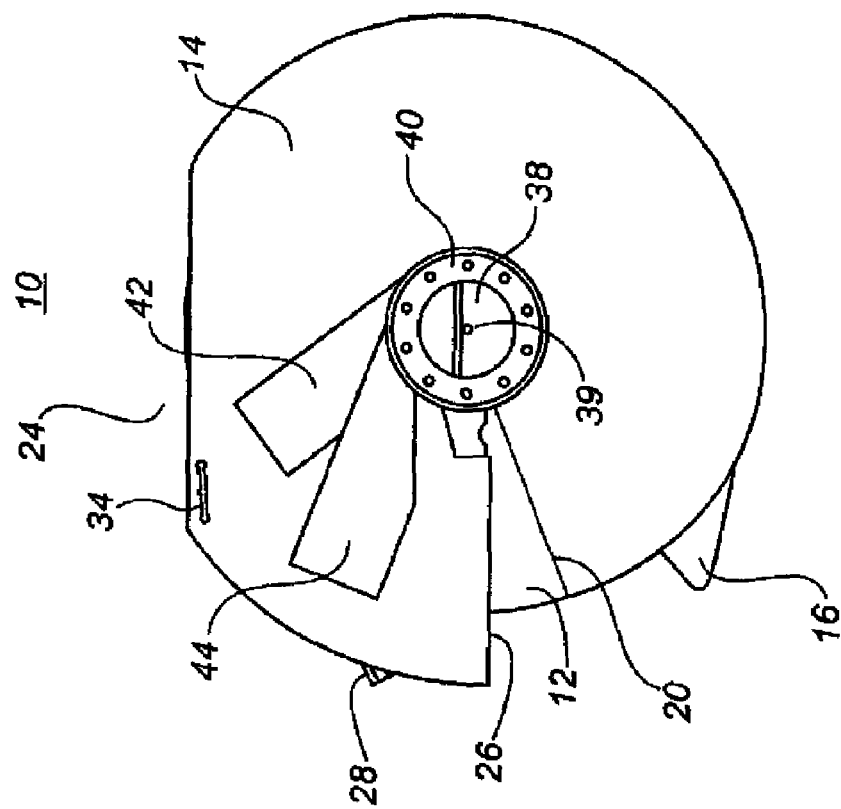
FIG. 4 is a bottom plan view depicting the auger of FIG. 1.

Referring to FIGS. 3 and 4, braces 42 and 44 are illustrated. In a representative embodiment, braces 42 and 44 are welded to the underside of bottom flight 14 to minimize deflection of bottom flight 14 from the weight of the feed rations when auger 10 is in operation. When a vertical feed mixer is completely loaded with feed components, the weight of the TMR within the tub may cause the outer portion of bottom flight 14 to deflect into the mixer floor. Braces 42 and 44 prohibit or minimize this deflection.

Figure 7:
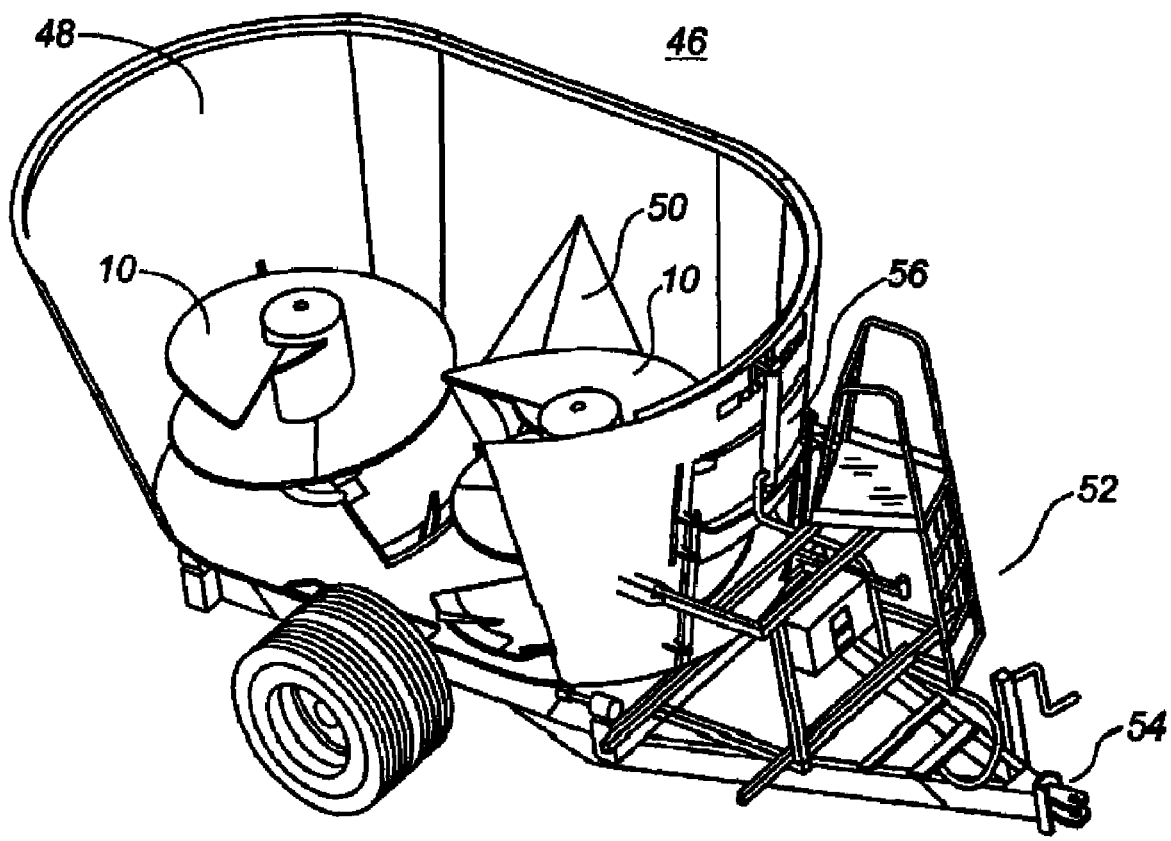
FIG. 7 is a top perspective cutaway view depicting a feed mixing tub having two of the augers depicted in FIG. 1.

Referring to FIG. 7, vertical feed mixer 46 having open-top mixing tub 48 is shown with two augers 10. In this representative embodiment, mixer 46 is shown mounted on trailer 52 having hitch 54 for attaching to a motor vehicle although it should be obvious to those skilled in the art that mixer 46 can be mounted on the bed of a truck or configured as a stand-alone mixer. Mixing tub 48 is shown with baffles 50 that act to partially segregate tub 48 into two portions, each having an auger 10. In operation, feed components are introduced into tub 48 from the top. Augers 10 are then operated to mix the components together. Once the feed components are mixed, feed gate 56 is opened while augers 10 are rotating to allow mixed feed to exit. It should also be apparent to those skilled in the art that one or more feed gates 56 can be located on any suitable position on the outer sidewalls of mixing tub 48 to allow the removal of mixed feed from mixer 46.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

We claim:

1. An auger for a feed mixing tub, comprising:
   a) a substantially vertical pipe having upper and lower ends;
   b) a spiral flight disposed about the circumference of the pipe, the spiral flight extending from the lower end to the upper end of the pipe, the spiral flight forming less than two complete 360-degree auger flights, the spiral flight having a leading edge near the lower end of the pipe and a trailing end near the upper end of the pipe, the leading edge wider than the width of the spiral flight near the upper end, the auger flights comprising a pitch spacing that is greater in dimension than the width of the auger flights;

c) a kicker disposed on the spiral flight near the leading edge for deflecting feed mix towards the centre of the auger when the auger is rotating in the mixing tub; and d) an upturned portion disposed on the spiral flight near the trailing end for deflecting feed mix away from the centre of the auger when the auger is rotating in the mixing tub.

2. The auger as set forth in claim 1 further comprising fastening means for fastening the auger to a mixer drive unit disposed in the mixing tub.

3. The auger as set forth in claim 1 wherein the spiral flight further comprises at least one knife slot for operatively attaching a knife for cutting feed mix when the auger is rotating in the mixing tub.

4. The auger as set forth in claim 3 further comprising the knife disposed in the knife slot.

5. The auger as set forth in claim 1 wherein the spiral flight further comprises at least one brace for reinforcing the spiral flight.

6. The auger as set forth in claim 5 wherein the at least one brace is disposed on the underside of the spiral flight.

7. The auger as set forth in claim 1 wherein the spiral flight further comprises at least one wear plate disposed near the leading edge.

8. The auger as set forth in claim 1 wherein the kicker further comprises a kicker wear plate.

9. A feed mixer, comprising:
a) a feed mixing tub;
b) at least one auger disposed in the mixing tub, comprising:
  i) a substantially vertical pipe having upper and lower ends,
  ii) a spiral flight disposed about the circumference of the pipe, the spiral flight extending from the lower end to the upper end of the pipe, the spiral flight forming less than two complete 360-degree auger flights, the spiral flight having a leading edge near the lower end of the pipe and a trailing end near the upper end of the pipe, the leading edge wider than the width of the spiral flight near the upper end, the auger flights comprising a pitch spacing that is greater in dimension than the width of the auger flights,
  iii) a kicker disposed on the spiral flight near the leading edge for deflecting feed mix towards the centre of the auger when the auger is rotating in the mixing tub, and
  iv) an upturned portion disposed on the spiral flight near the trailing end for deflecting feed mix away from the centre of the auger when the auger is rotating in the mixing tub;
c) a mixer drive unit for rotating the auger; and
d) fastening means for fastening the auger to the mixer drive unit.

10. The feed mixer as set forth in claim 9 wherein the spiral flight further comprises at least one knife slot for operatively attaching a knife for cutting feed mix when the auger is rotating in the mixing tub.

11. The feed mixer as set forth in claim 10 further comprising the knife disposed in the knife slot.

12. The feed mixer as set forth in claim 9 wherein the spiral flight further comprises at least one brace for reinforcing the spiral flight.

13. The feed mixer as set forth in claim 12 wherein the at least one brace is disposed on the underside of the spiral flight.

14. The feed mixer as set forth in claim 9 wherein the spiral flight further comprises at least one wear plate disposed near the leading edge.

15. The feed mixer as set forth in claim 9 wherein the kicker further comprises a kicker wear plate.

16. The feed mixer as set forth in claim 9 further comprising a second auger disposed in the mixing tub, the second auger operatively coupled to the mixer drive unit.

17. The feed mixer as set forth in claim 16 wherein the mixing tub further comprises at least one baffle for partially segregating the mixing tub into two portions.

18. The feed mixer as set forth in claim 9 further comprising a trailer, the mixing tub mounted on the trailer.

19. The feed mixer as set forth in claim 9 wherein the mixing tub further comprises at least one feed gate that can be opened to dispense mixed feed from the mixing tub when the at least one auger is rotating.

\* \* \* \* \*